UNITED STATES PATENT OFFICE.

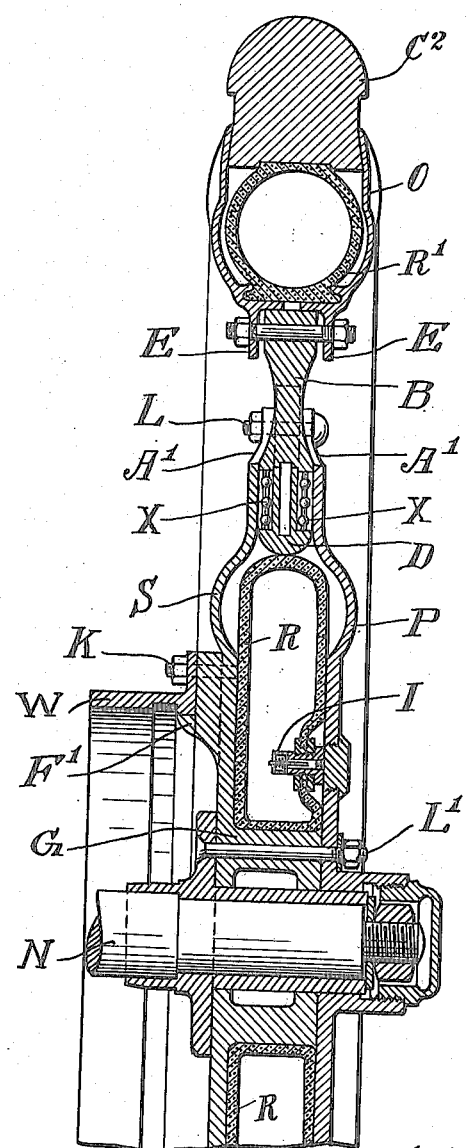

WLADIMIR ALEXANDROWSKY AND ANANIUS SLOBINSKI, OF ST. PETERSBURG, RUSSIA.

PNEUMATIC WHEEL.

1,143,565.      Specification of Letters Patent.    Patented June 15, 1915.

Application filed December 16, 1911. Serial No. 666,157.

*To all whom it may concern:*

Be it known that we, WLADIMIR ALEXANDROWSKY, nobleman, and ANANIUS SLOBINSKI, citizen, both the subjects of the Emperor of Russia, and residents of St. Petersburg, Russia, have invented new and useful Improvements in Pneumatic Wheels, of which the following is a specification.

The shortcomings of the ordinary pneumatic tires and the expense caused thereby to owners of motor vehicles are well known.

The object of our present invention is to produce a pneumatic wheel in which the air cushion is so arranged that it does not come in contact with the road, whereby it is protected against rapid wear and against punctures, which are the frequent cause of accidents, delays and other inconveniences.

According to our invention, the air cushion is placed between two parallel disks spaced apart and secured to the hub of the wheel, which forms a support for the air cushion. Between the two disks is guided the movable rim, which is held in contact with the air cushion and has secured to it a solid tire. A second air cushion may be placed between the rim and the tire, whereby the shock absorbing quality of the wheel is further increased.

The drawing shows cross-section through part of a wheel made in accordance with our invention.

Our new wheel consists of three principal parts: The first part comprises two disks S and P spaced apart and mounted on the bushing surrounding the axle N and secured together near said axle by means of bolts $L^1$. Moreover, the two disks are held together by bolts L, passing through lugs $A_1$, arranged symmetrically along the periphery of both disks. Along their middle portion, *i. e.* between the center and the periphery, the disks are bulged outwardly, as clearly shown. Into the annular chamber thus formed projects the outer end of the air cushion R, provided with the air valve I. The air cushion R is arranged in the open space between the two disks S and P and is seated on the hub-like portion G of the disk S. To the latter is fastened a cup-shaped member W, which is held on shoulders $F'$ formed on disk S and is secured by bolts K. The part W is supposed to receive the brake for the axle N. The second part is represented by the metallic rim E which is secured to the outer ends of the spokes B, some of which have sockets for receiving the antifriction members, marked X. The inner ends of the spokes are secured to a ring D, of semicircular cross-section. The rim E, the spokes B and the ring D form practically one piece.

When the air cushion R is fully inflated, it completely fills the space between the two disks S and P and it bears firmly against the ring D. Where the two disks bulge outwardly, a free space is left, whereby the air cushion is afforded an opportunity to expand under heavy loads.

The air cushion R bearing against the ring D, supports the weight of the car and as the wheel rotates, the two disks can move in a vertical direction, the friction between the inner walls of the disks and the members X being reduced by the steel balls, provided in said members on both sides thereof, as shown. The air cushion being located between the disks S and P and bearing with its outer circumference against the ring D, it will cause the entire second part together with the rim E to rotate with it.

Due to the novel construction, the axle is efficiently protected against shocks, which might cause the axle to break, and the body of the car and, therefore, the motor are not subjected to the heavy jolts, which often interfere with the smooth working of the motor. Also the fittings of the cars are subjected to less rapid wear.

An additional air cushion $R_1$ is secured to the wheel rim E, and protected by wooden strips $C_2$ which are laid firmly over the air cushion one against the other, so as to form a wooden rim, which is held in place by specially shaped metallic guards O, allowing the wooden strips to move freely toward the axle in a vertical direction under a load. The tread surface of each wooden strip $C_2$ is of convex shape, so that upon wear it will not interfere with the free relative movement of the strips.

We claim:

In a pneumatic wheel, the combination with the hub, of two spaced parallel disks secured to the hub, an air cushion supported between said disks and by said hub, a movable rim guided by said disks, a movable solid tire mounted on said rim and forming the tread, metallic guards secured to said rim for guiding said solid tire, and a second air cushion between said rim and said solid tire and supported by said rim.

In testimony whereof, we have signed our names to this specification in the presence of two subscribing witnesses.

WLADIMIR ALEXANDROWSKY.
ANANIUS SLOBINSKI.

Witnesses:
H. A. LOVIAGUINE,
A. N. TSCHEMALOFF.